(12) United States Patent
Oketani et al.

(10) Patent No.: US 8,223,017 B2
(45) Date of Patent: *Jul. 17, 2012

(54) CONTROL APPARATUS OF SHOWCASE

(75) Inventors: Tetsuya Oketani, Ota (JP); Masayuki Tanji, Gunma-ken (JP); Masanobu Takeuchi, Ota (JP); Yutaka Nishizaka, Ota (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 462 days.

This patent is subject to a terminal disclaimer.

(21) Appl. No.: 12/274,597

(22) Filed: Nov. 20, 2008

(65) Prior Publication Data

US 2009/0135011 A1 May 28, 2009

(30) Foreign Application Priority Data

Nov. 22, 2007 (JP) ................................. 2007-303579

(51) Int. Cl.
G08B 13/00 (2006.01)
(52) U.S. Cl. ........................................................ 340/541
(58) Field of Classification Search .................. 340/541, 340/525, 545.3, 555, 815.4; 362/276
See application file for complete search history.

(56) References Cited

U.S. PATENT DOCUMENTS

| | | | | |
|---|---|---|---|---|
| 4,864,278 A | * | 9/1989 | Wiley | 340/555 |
| 6,726,341 B2 | * | 4/2004 | Pashley et al. | 362/92 |
| 6,951,402 B1 | * | 10/2005 | Copp | 362/94 |
| 7,391,337 B2 | * | 6/2008 | St-Germain | 340/686.1 |
| 7,568,358 B2 | * | 8/2009 | Wetekamp | 62/126 |
| 2003/0150146 A1 | | 8/2003 | Martin et al. | 40/544 |
| 2005/0265019 A1 | | 12/2005 | Sommers et al. | 362/217 |
| 2006/0176697 A1 | * | 8/2006 | Arruda | 362/276 |
| 2007/0171647 A1 | * | 7/2007 | Artwohl et al. | 362/276 |

FOREIGN PATENT DOCUMENTS

| | | |
|---|---|---|
| JP | 8-224150 | 9/1996 |
| JP | 2546302 | 5/1997 |

OTHER PUBLICATIONS

European Search Report dated Nov. 23, 2009.

* cited by examiner

*Primary Examiner* — Phung Nguyen
(74) *Attorney, Agent, or Firm* — Kratz, Quintos & Hanson, LLP

(57) ABSTRACT

An object is to provide a control apparatus of a showcase in which appropriate illumination having a high presentation effect can be realized by an LED illumination apparatus having a high durability against turning ON/OFF and capable of securing a predetermined illumination intensity even under an environment at a low temperature. The control apparatus controls a plurality of showcases so that display chambers where commodities are displayed are illuminated with LED illumination apparatuses, and includes a person detecting sensor provided in a showcase disposed in such a position that the approaching of any person can first be detected among the plurality of arranged showcases, so that the approaching of the person is detected. When the person detecting sensor detects the approaching of the person, the illumination intensities of all the LED illumination apparatuses of the plurality of showcases are increased.

12 Claims, 7 Drawing Sheets

CONTROL APPARATUS OF SHOWCASE

BACKGROUND OF THE INVENTION

The present invention relates to a control apparatus which controls a plurality of showcases in which the insides of display chambers for displaying commodities are illuminated with LED illumination apparatuses.

Heretofore, in a showcase which displays commodities in a display chamber and which is provided with illumination apparatuses for illuminating the commodities, fluorescent lamps have been used as the illumination apparatuses (e.g., see Patent Document 1. Pillars are vertically provided in the center of the edge of a front-surface opening or on both sides of the opening edge in a vertical direction, and the fluorescent lamps are attached to the rear surfaces of the pillars to illuminate the inside of the display chamber from the front side (e.g., Japanese Patent Application Laid-Open No. 8-224150 (Patent Document 1) and Japanese Utility Model Registration No. 2546302 (Patent Document 2)).

The above-mentioned fluorescent lamps are forced to be subjected to a replacement operation owing to luminance lowering or lighting defect due to aged deterioration. Therefore, a user is forced to perform the replacement operation of the fluorescent lamps, which causes a problem that the operation becomes laborious. A new fluorescent lamp for replacement needs to be constantly stored, and a storage place for the fluorescent lamp needs to be secured. Furthermore, the fluorescent lamp contains mercury, and hence there has been a problem that the used fluorescent lamp cannot easily be discarded.

Moreover, the display chamber as a cooling space has a low temperature, and the heretofore used fluorescent lamp therefore requires a certain degree of time for realizing a predetermined illumination intensity immediately after the lamp is turned on. In consequence, when the fluorescent lamp is frequently turned on/off, stable illumination cannot be performed, which sometimes causes a problem that the life of the fluorescent lamp itself shortens. Therefore, it has been difficult to realize an illumination presentation effect by the frequent turning ON/OFF or illumination intensity changing control. Consequently, it has been difficult to realize the illumination entirely having a high presentation effect by controlling the illumination apparatuses provided in the plurality of showcases.

SUMMARY OF THE INVENTION

The present invention has been developed to solve a conventional technical problem, and an object thereof is to provide a control apparatus of a showcase in which appropriate illumination having high presentation effect can be realized by an LED illumination apparatus having a high durability against turning ON/OFF and capable of securing a predetermined illumination intensity even under an environment at a low temperature.

According to the invention of a first aspect, there is provided a control apparatus which controls a plurality of showcases so that display chambers where commodities are displayed are illuminated with LED illumination apparatuses, characterized by comprising: a person detecting sensor provided in a showcase disposed in such a position that the approaching of any person is first detected among the plurality of arranged showcases, so that the approaching of the person is detected, wherein when the person detecting sensor detects the approaching of the person, the illumination intensities of all the LED illumination apparatuses of the plurality of showcases are increased.

A control apparatus of the invention of a second aspect is characterized in that in the above invention, the illumination intensities of the LED illumination apparatuses are increased successively from the showcase provided with the person detecting sensor to the showcase disposed in a position far from the showcase provided with the person detecting sensor.

According to the invention of a third aspect, there is provided a control apparatus which controls a plurality of showcases so that display chambers where commodities are displayed are illuminated with LED illumination apparatuses, characterized by comprising: person detecting sensors provided in the plurality of arranged showcases, respectively, so that the approaching of any person is detected, wherein when one of the person detecting sensors detects the approaching of the person, the illumination intensities of all the LED illumination apparatuses of the plurality of showcases are increased to a first illumination intensity, and the illumination intensity of the LED illumination apparatus of the showcase provided with the person detecting sensor which has detected the approaching of the person is increased to a second illumination intensity brighter than the first illumination intensity.

The invention of a fourth aspect is characterized in that in the above invention, the first illumination intensity is dark in the showcase installed in a position far from the showcase provided with the person detecting sensor which has detected the approaching of the person.

According to the invention of a fifth aspect, there is provided a control apparatus which controls a plurality of showcases so that display chambers where commodities are displayed are illuminated with LED illumination apparatuses, characterized by comprising: person detecting sensors provided in the plurality of arranged showcases, respectively, so that the approaching of any person is detected, wherein when one of the person detecting sensors detects the approaching of the person, the illumination intensity of the LED illumination apparatus of the showcase adjacent to the showcase provided with the person detecting sensor is increased to a first illumination intensity, and the illumination intensity of the LED illumination apparatus of the showcase provided with the person detecting sensor which has detected the approaching of the person is increased to a second illumination intensity brighter than the first illumination intensity.

A control apparatus of the invention of a sixth aspect is characterized in that in the above inventions, the plurality of showcases are provided in at least two rows so as to face each other, the person detecting sensor is provided in one of the showcases facing each other, and the control of the LED illumination apparatus by the detection of the person detecting sensor is executed with respect to both the LED illumination apparatuses of the pair of showcases facing each other.

A control apparatus of the invention of a seventh aspect is characterized in that the above inventions further comprises: an illumination intensity sensor which detects the brightness of a surrounding area, wherein the maximum illumination intensity of the LED illumination apparatus is determined in accordance with the brightness of the surrounding area detected by the illumination intensity sensor, and the LED illumination apparatus is brightened to the determined maximum illumination intensity or the second illumination intensity regarded as the maximum illumination intensity.

A control apparatus of the invention of an eighth aspect is characterized in that in the above inventions, each showcase displays the commodities in the display chamber while cooling the commodities, and includes a temperature sensor which detects a temperature in the display chamber, and in a case where the temperature sensor detects that the temperature in the display chamber increases to a preset high temperature value, the illumination intensity of the LED illumination apparatus of the showcase provided with the temperature sensor is decreased.

According to the invention of the first aspect, the control apparatus which controls the plurality of showcases so that the display chambers where the commodities are displayed are illuminated with the LED illumination apparatuses comprises the person detecting sensor provided in the showcase disposed in such a position that the approaching of the person is first detected among the plurality of arranged showcases, so that the approaching of the person is detected. When the person detecting sensor detects the approaching of the person, the illumination intensities of all the LED illumination apparatuses of the plurality of showcases are increased. In consequence, the approaching of the person is detected by the less number of the person detecting sensors, and the illumination intensities of all the LED illumination apparatuses of the plurality of showcases can be controlled based on this detection. Therefore, the high rise of installation cost can be suppressed.

Moreover, based on the detection of the approaching of the person by the person detecting sensor provided in the showcase in such a position that the approaching of the person can first be detected, all the LED illumination apparatuses perform-illumination with the bright illumination intensity. Therefore, it is possible to suppress the high rise of running cost due to the lighting of the LED illumination apparatuses more than necessary.

According to the invention of the second aspect, in addition to the above invention, the illumination intensities of the LED illumination apparatuses are increased successively from the showcase provided with the person detecting sensor to the showcase disposed in the position far from the showcase provided with the person detecting sensor. An illumination presentation effect by the LED illumination apparatus provided in each showcase can be improved, and a display effect can be improved.

According to the invention of the third aspect, the control apparatus which controls the plurality of showcases so that the display chambers where the commodities are displayed are illuminated with the LED illumination apparatuses comprises the person detecting sensors provided in the plurality of arranged showcases, respectively, so that the approaching of any person is detected. When one of the person detecting sensors detects the approaching of the person, the illumination intensities of all the LED illumination apparatuses of the plurality of showcases are increased to the first illumination intensity, and the illumination intensity of the LED illumination apparatus of the showcase provided with the person detecting sensor which has detected the approaching of the person is increased to the second illumination intensity brighter than the first illumination intensity. In consequence, with the movement of the person, the showcase to be illuminated with the illumination intensity brighter than that of the LED illumination apparatus of another showcase can be moved. Consequently, the showcase most approached by the person can constantly be illuminated more brightly than another showcase. The presentation effect can be improved, and customers' interest can be attracted.

Moreover, as in the invention of the fourth aspect, the first illumination intensity is dark in the showcase installed in the position far from the showcase provided with the person detecting sensor which has detected the approaching of the person. In consequence, the presentation effect can further be improved.

According to the invention of the fifth aspect, the control apparatus which controls the plurality of showcases so that display chambers where the commodities are displayed are illuminated with the LED illumination apparatuses comprises the person detecting sensors provided in the plurality of arranged showcases, respectively, so that the approaching of the person is detected. When one of the person detecting sensors detects the approaching of the person, the illumination intensity of the LED illumination apparatus of the showcase adjacent to the showcase provided with the person detecting sensor is increased to the first illumination intensity, and the illumination intensity of the LED illumination apparatus of the showcase provided with the person detecting sensor which has detected the approaching of the person is increased to the second illumination intensity brighter than the first illumination intensity. With the movement of the person, the showcase to be illuminated with the illumination intensity brighter than that of the LED illumination apparatus of the adjacent showcase can be moved. In consequence, the showcase approached most by the person can constantly be illuminated more brightly than the adjacent showcase. The presentation effect can be improved, and the customers' interest can be attracted.

According to the invention of the sixth aspect, in addition to the above inventions, the plurality of showcases are provided in at least two rows so as to face each other, the person detecting sensor is provided in one of the showcases facing each other, and the control of the LED illumination apparatus by the detection of the person detecting sensor is executed with respect to both the LED illumination apparatuses of the pair of showcases facing each other. In consequence, the illumination intensity of the LED illumination apparatus of the showcase can be controlled based on the detection of the approaching of the person by the person detecting sensor provided in the corresponding showcase without providing the person detecting sensors in all the showcases.

Therefore, as compared with a case where the person detecting sensors are installed in all the showcases, the high rise of the installation cost can be suppressed. Moreover, similar illumination control is performed with respect to a pair of showcases facing each other, and hence the presentation effect can be improved.

According to the invention of the seventh aspect, the above inventions further comprise the illumination intensity sensor which detects the brightness of a surrounding area. The maximum illumination intensity of the LED illumination apparatus is determined in accordance with the brightness of the surrounding area detected by the illumination intensity sensor, and the LED illumination apparatus is brightened to the determined maximum illumination intensity or the second illumination intensity regarded as the maximum illumination intensity. In consequence, the brightness of the LED illumination apparatus of the showcase can be harmonized with that of a surrounding area such as a store in which the showcase is installed, and incompatibility with the surrounding illumination can be avoided.

Consequently, the display chambers in the respective showcases can be illuminated by the LED illumination apparatuses with an appropriate illumination intensity, and an illumination effect can be improved.

According to the invention of the eighth aspect, in addition to the above inventions, each showcase displays the commodities in the display chamber while cooling the commodities, and includes the temperature sensor which detects the temperature in the display chamber. In a case where the temperature sensor detects that the temperature in the display chamber increases to the preset high temperature value, the illumination intensity of the LED illumination apparatus of the showcase provided with the temperature sensor is decreased. In consequence, control can be performed so as to decrease heat generated by the LED illumination apparatus itself based on the temperature of the installation environment of the LED illumination apparatus.

In consequence, it is possible to avoid disadvantages that the LED illumination apparatus is lit with the bright illumination intensity in a state in which the inside of the display chamber is not cooled to a predetermined cooling temperature during, for example, a trial operation, maintenance or the like and that the LED illumination apparatus is extraordinarily heated to cause the deterioration and failure of the apparatus itself.

DETAILED DESCRIPTION OF THE PREFERRED EMBODIMENTS

Embodiments of the present invention will hereinafter be described with reference to the drawings.

Embodiment 1

Figure 1:
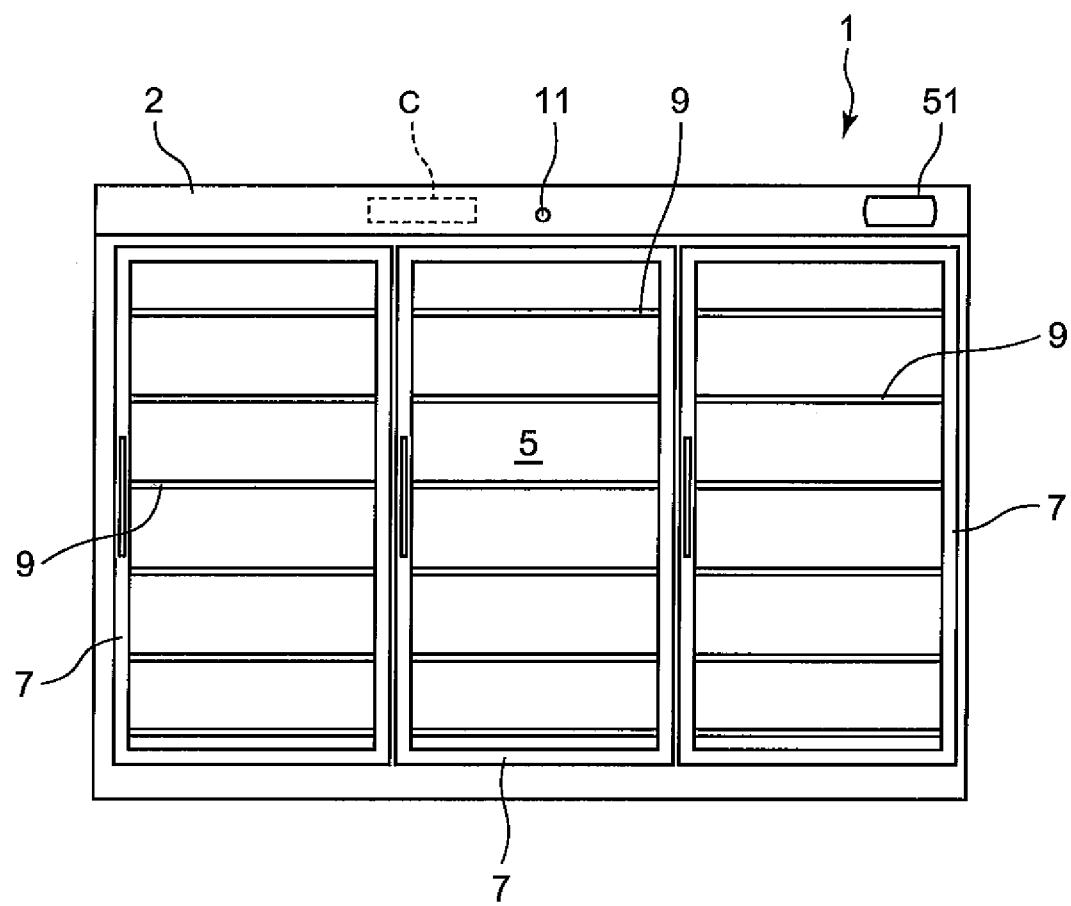
FIG. 1 is a front view of a showcase to which the present invention is applied.
Figure 2:
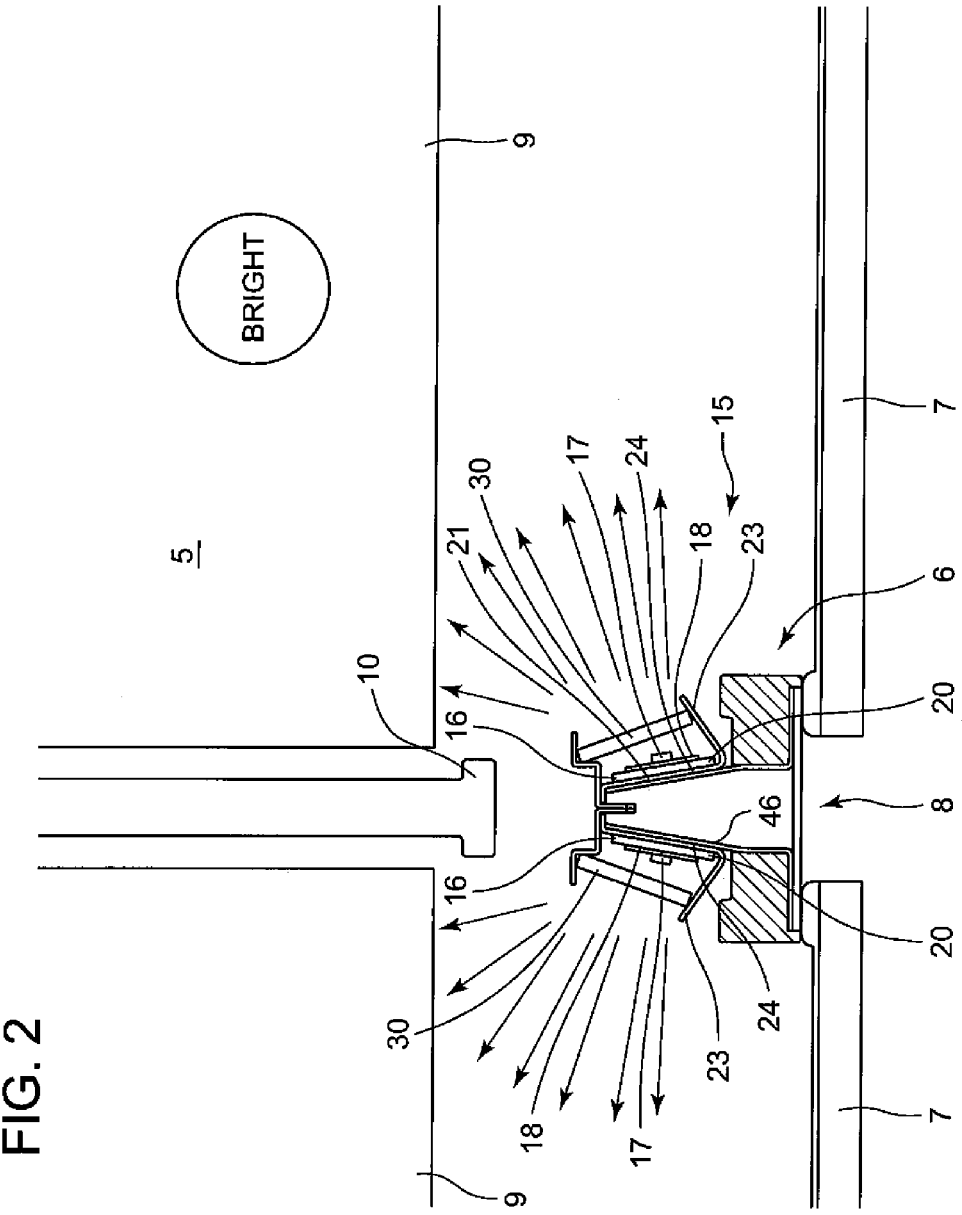
FIG. 2 is a partially enlarged sectional view of the showcase of FIG. 1.

FIG. 1 shows a front view of a showcase 1 to which the present invention is applied, and FIG. 2 shows a partially enlarged sectional view of the showcase 1. The showcase 1 is a low-temperature showcase having a main body constituted of an insulating box body (an insulating wall) 2 having an open front surface.

A display chamber 5 is constituted in this insulating box body 2, and a front-surface opening 6 of the display chamber 5 across the upper and lower ends of the opening is openably closed by a plurality of rotary glass doors 7 through which the inside can be seen. In the edge of the front-surface opening 6 of the insulating box body 2, a plurality of pillars 8 are vertically provided with a predetermined space being left between the pillars. According to such a constitution, the edge of the rear surface of each glass door 7 comes in close contact with the edge of the front-surface opening 6 and the front surface of each pillar 8 to close the display chamber 5.

Moreover, shelf pillars 10 are vertically provided in the back surface and front part of the display chamber 5, and a plurality of stages of shelves 9 are disposed on the shelf pillars 10. It is to be noted that the shelf pillars 10 are provided with a plurality of engagement holes formed with a predetermined space being left between the holes. When the engagement holes for disposing the shelves 9 are changed, the height positions of the shelves 9 can be changed.

Furthermore, in the upper part of the display chamber 5, a cooler and a blower constituting a cooling apparatus R (shown only in FIG. 5) are installed. The cooler constitutes the cooling apparatus which is separately installed and in which a so-called refrigerant cycle is constituted together with a compressor (not shown), a condenser (not shown) and the like. When cold air from this cooler is forcibly circulated through the display chamber 5 by the blower, the inside of the display chamber 5 is cooled to a predetermined temperature.

Here, LED illumination apparatuses 15 are vertically provided on an inner side from the edge of the opening 6 of the insulating box body 2 constituting the main body, specifically on the front corners of the display chamber 5, and the pillars 8. Each of the LED illumination apparatuses 15 is constituted of a plurality of LED illumination members 16, a holding member 21 holding the LED illumination members 16 and attached on the inner side from the edge of the opening 6 of the insulating box body 2, shades 30 and the like.

Figure 3:
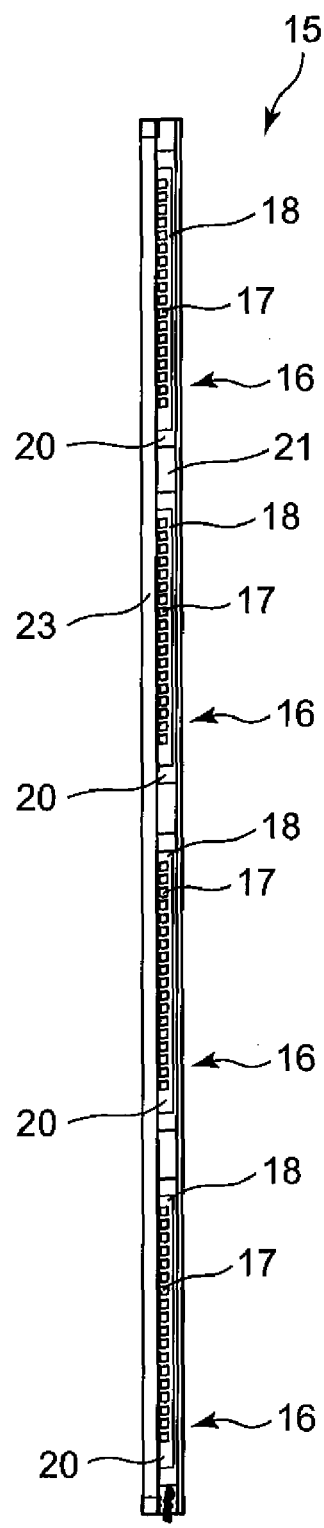
FIG. 3 is a side view of an illumination device.

As shown in the side view of the LED illumination apparatus 15 of FIG. 3, each of the LED illumination members 16 is constituted of a substrate 18 provided with a plurality of LED elements 17, and the substrate 18 is fixed to an attachment plate 20. The substrate 18 is constituted so as to extend in a longitudinal direction, and the substrate 18 is provided with the plurality of LED elements 17 with a predetermined space being left between the elements. The LED elements 17 in the present embodiment are chip-type white LED elements.

Moreover, the attachment plate 20 provided with the LED element 17 is fixed to the holding member 21 constituted so as to extend vertically with respect to the front-surface opening 6 of the insulating box body 2 with screws. This holding member 21 abuts on an illumination attachment portion 46 provided on the rear surface of the pillar 8 so as to extend rearwards or the rear surface of a front wall constituting the front corner of the insulating box body 2.

The holding member 21 has a substantially U-shaped section, and an opening of the member positioned on the side of light irradiation of the LED element 17 attached to the inner portion of the member is provided with the vertical shade 30 constituted of a light transmitting colorless transparent material. It is to be noted that in the present embodiment, side walls 24 each facing the opening of the holding member 21 having the substantially U-shaped section abut on and are fixed to both side surfaces of the illumination attachment portion 46 of the pillar 8. Therefore, the holding members 21 provided with the LED elements 17 (the LED illumination apparatuses 15 constituted of the plurality of LED illumination members 16) are provided back to back via the illumination attachment portion 46 of the pillar 8. Moreover, the LED illumination apparatus 15 provided in the front corner is provided so that irradiation light from the LED elements 17 is emitted to the inside of the display chamber 5.

It is to be noted that the front wall of the holding member 21 is a reflective plate portion 23 positioned behind the pillar 8 and bent as much as a predetermined angle rearwards.

Moreover, in the present embodiment, the plurality of (four) LED illumination members 16 described above are attached to the holding member 21. The LED illumination apparatus 15 may be constituted of the single LED illumination member 16 constituted across the upper and lower ends of the front-surface opening 6. However, when the apparatus is constituted of a plurality of LED illumination members 16 as in the present embodiment, production cost can be decreased, and handleability can be improved.

Figure 4:
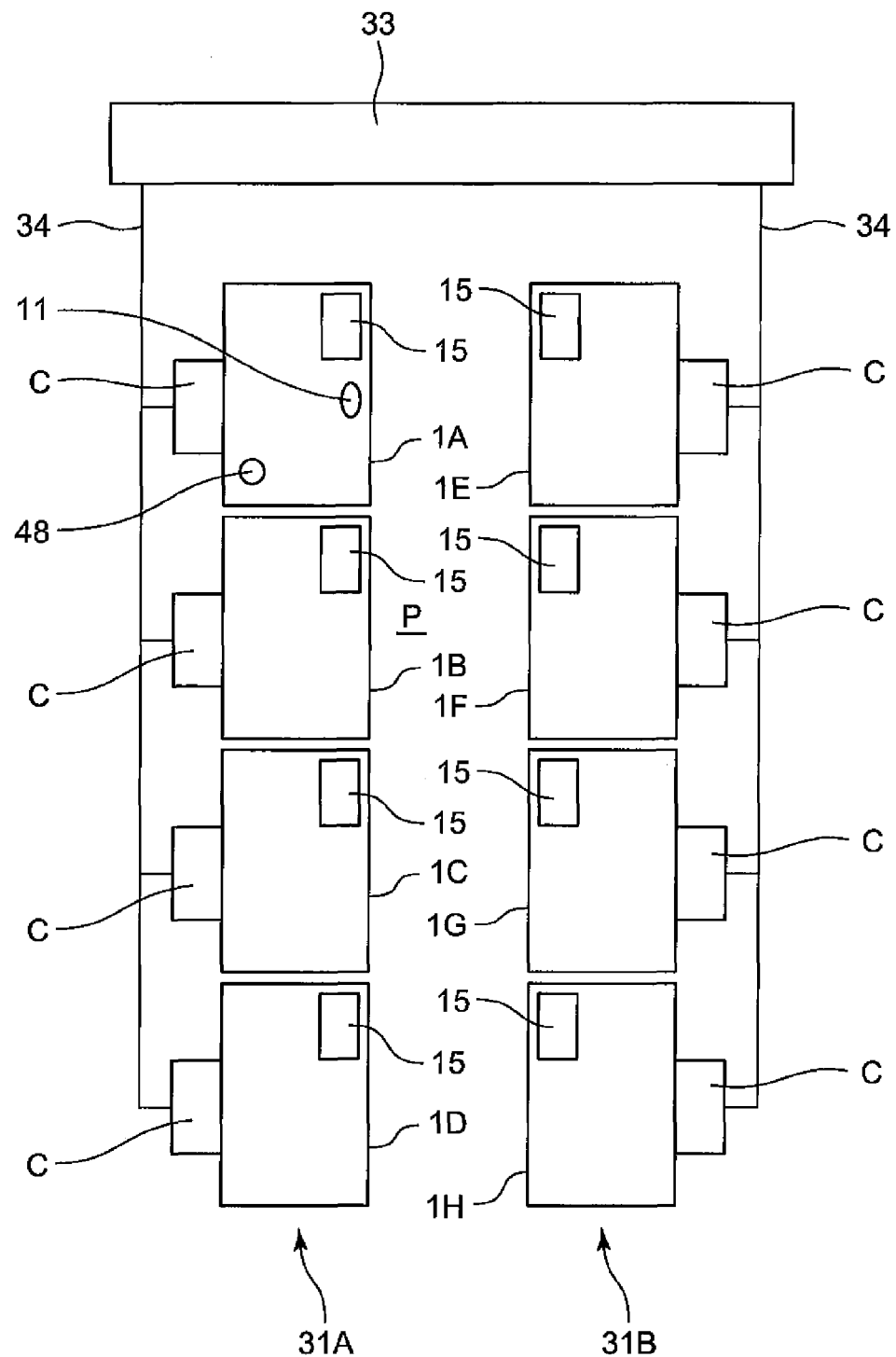
FIG. 4 is a control system constitution diagram (Embodiment 1)

Next, a control apparatus of the showcase of the present invention will be described with reference to a control system constitution diagram of FIG. 4. The control apparatus of the present invention is employed in a store such as a supermarket in which a plurality of showcases 1 described above are installed. In the present embodiment, as one example, the four (the plurality of) showcases 1 are arranged in a row 31, two rows (31A, 31B) are provided so as to face each other, and a passage P through which customers pass is formed with a predetermined space being left between these rows of the showcases 1. That is, the showcases constituting the row 31A are showcases 1A, 1B, 1C and 1D in order from the entrance side of the passage P, and the showcases constituting the row 31B are showcases 1E, 1F, 1G and 1H in order from the entrance side of the passage P. Therefore, the showcases 1A and 1E, the showcases 1B and 1F, the showcases 1C and 1G, or the showcases 1D and 1H face each other to constitute a pair.

The control apparatus in the present embodiment is constituted of a main control apparatus 33 constituted of a versatile microcomputer, and case control apparatuses C provided in the showcases 1, respectively. The main control apparatus 33 is provided in a security guards room of the supermarket or the like, and is connected to the case control apparatuses C via communication lines 34.

Figure 5:
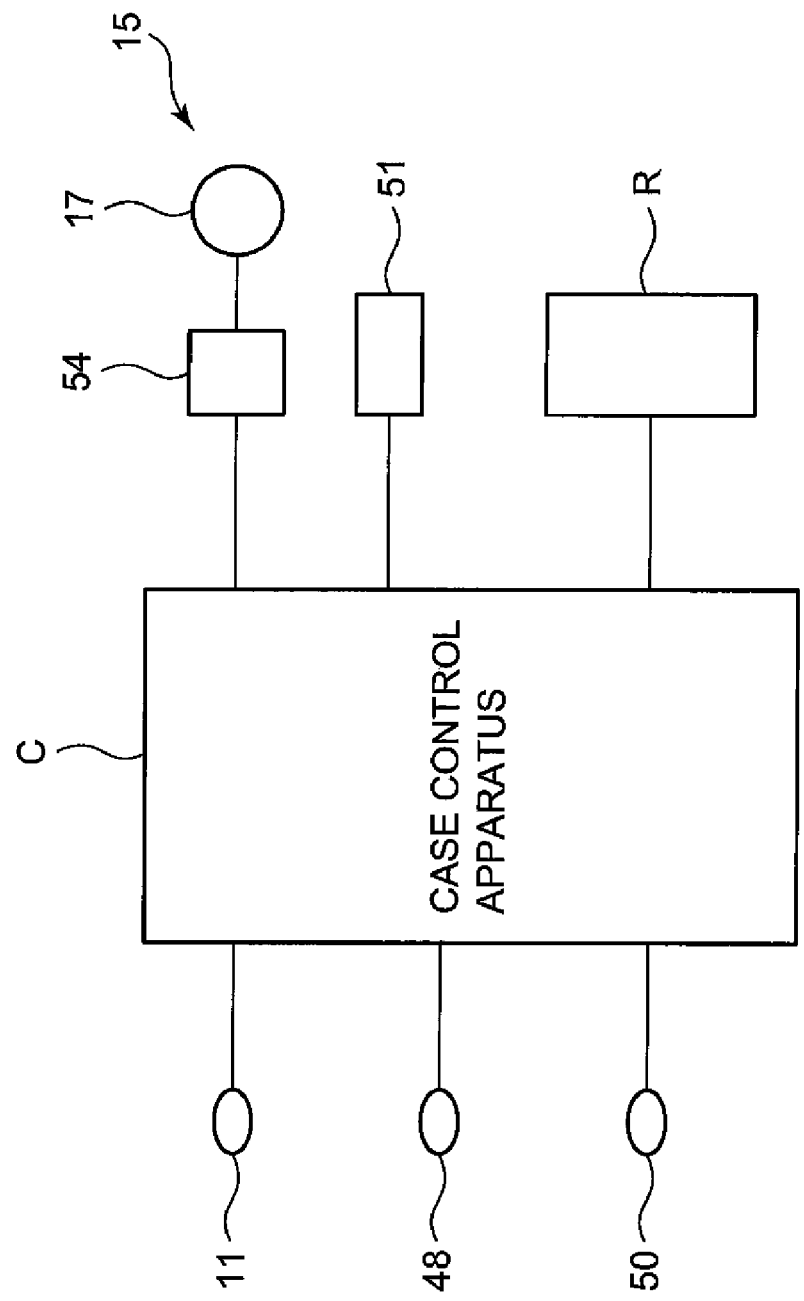
FIG. 5 is an electric block diagram of a case control apparatus.

Each of the case control apparatuses C is constituted of the versatile microcomputer, and is connected to a person detecting sensor 11 which detects that a person has approached the showcase 1, an illumination intensity sensor 48 for detecting an illumination intensity (the surrounding illumination intensity) in the store or the like where the showcase 1 is installed, and an in-chamber temperature sensor 50 for detecting a temperature in the display chamber 5 on an input side as shown in an electric block diagram of FIG. 5.

In the present embodiment, the person detecting sensor 11 is installed in the showcase 1 provided in such a position that the approaching of any person who enters the passage P can first be detected among the showcases 1 constituting the passage P described above. Here, the person detecting sensor is provided in one of the showcases 1 positioned in the end of the passage P and facing each other, that is, the front surface of the center of the upper part of the insulating box body 2 constituting the showcase 1A.

Moreover, the illumination intensity sensor 48 is provided on the outer surface of the main body 2, for example, a top surface as a position which is not easily influenced by the shape of a peripheral device. It is to be noted that the illumination intensity sensors 48 may be installed in the plurality of installed showcases 1, respectively, or the illumination intensity sensor may be installed only in one showcase, for example, the showcase in which the person detecting sensor 11 is installed.

Furthermore, the case control apparatus C on an output side is connected to the cooling apparatus R constituted of the compressor, the blower and the like as described above, and is connected to the LED element 17 of the LED illumination apparatus 15 via an inverter 54. Additionally, the case control apparatus C on the output side is connected to a temperature display section (temperature display means) 51 provided on the front surface of the upper part of the main body 2 so as to display the temperature in the display chamber 5 or the present mode.

The illumination control of each showcase 1 in the present embodiment having the above constitution will be described. First, the case control apparatus C of the showcase 1A provided with the illumination intensity sensor 48 detects the illumination intensity in the store (the surrounding area) by the illumination intensity sensor 48, and transmits the illumination intensity to the main control apparatus 33. The main control apparatus 33 determines the maximum illumination intensity of each LED illumination apparatus 15 provided in the display chamber 5 of each showcase 1 based on the illumination intensity. In the present embodiment, the maximum illumination intensity is determined so that the inside of the display chamber 5 is brightened as much as a predetermined illumination intensity as compared with the surrounding illumination intensity detected by the illumination intensity sensor 48.

Moreover, the case control apparatus C of the showcase 1A provided with the person detecting sensor 11 transmits, to the main control apparatus 33, an output indicating that the person approaches the passage P constituted by the showcases 1 based on the detection output of the person detecting sensor 11 indicating that the person approaches the showcase 1A, that is, the person enters a predetermined range of a distance from the showcase 1A.

In consequence, the main control apparatus 33 transmits an output indicating that the illumination intensities of the LED illumination apparatuses 15 be increased to the case control apparatuses C of all the showcases 1A to 1H. Based on this output, the case control apparatus C of each showcase energizes the LED elements 17 of the LED illumination apparatus 15. Therefore, in principle, the LED elements 17 of each LED illumination apparatus 15 are not energized and are turned off in a state in which the person detecting sensor 11 does not detect the approaching of the person.

At this time, based on the detection of the approaching of the person by the person detecting sensor 11, the main control apparatus 33 transmits an output to each case control apparatus C with a delay of a predetermined time so as to increase the illumination intensity of the LED illumination apparatus 15. That is, the main control apparatus 33 successively transmits the outputs to the case control apparatuses C of the showcase 1A provided with the person detecting sensor 11 and the showcase 1E forming the pair with the showcase 1A to the showcase 1D in a position far from the showcase 1A (1E) (the showcase 1H forming the pair with the showcase 1D) so as to increase the illumination intensities of the LED illumination apparatuses 15. Each case control apparatus C controls such a current/a voltage as to energize the LED elements 17 of each LED illumination apparatus 15 to gradually increase the illumination intensity from a state in which the LED elements are turned off, and finally the illumination intensity is increased to the maximum illumination intensity determined based on the surrounding illumination intensity as described above.

In consequence, the illumination intensities of the LED illumination apparatuses 15 are successively increased from the showcase 1A provided with the person detecting sensor 11 and the showcase 1E forming the pair with the showcase to the showcase 1D (1H) in the position far from the showcase, so that an illumination presentation effect by the LED illumination apparatus 15 provided in each showcase can be improved, and a display effect can be improved.

Moreover, in this case, each case control apparatus C gradually increases the illumination intensity of each LED element 17 from the turned-off state, and illuminates the inside of the display chamber 5 with the maximum illumination intensity determined based on the surrounding illumination intensity. Therefore, the brightness by the LED elements 17 of the LED illumination apparatus 15 of each showcase 1 can be determined in accordance with the brightness of a surrounding area such as the inside of the store where the showcase 1 is installed, and incompatibility with the surrounding illumination can be avoided.

In consequence, the inside of the display chamber 5 can effectively be illuminated by the LED illumination apparatus 15 with the appropriate illumination intensity, and an illumination effect can be realized.

Moreover, based on the output from the case control apparatus C of the showcase 1A indicating that the person detecting sensor 11 does not detect the approaching of the person, after the elapse of a predetermined time from a time of the output transmission, the main control apparatus 33 transmits an output to each case control apparatus C so as to decrease the illumination intensity of each LED illumination apparatus 15 or turn off the LED illumination apparatus. In consequence, each case control apparatus C decreases the energization of the LED elements 17 of the LED illumination apparatus 15, or stops the energization to turn off the LED elements based on the output from the main control apparatus 33.

Thus, in a case where the approaching of the person is detected by the person detecting sensor 11 provided in the showcase 1A disposed in such a position that the approaching of the person can first be detected among the plurality of arranged showcases 1A to 1D (1E to 1H), the illumination intensities of all the LED illumination apparatuses 15 of the plurality of showcases 1A to 1H are increased. In consequence, the approaching of the person is detected by the less number of the person detecting sensors, and the illumination intensities of all the LED illumination apparatuses of the showcases 1A to 1H can be controlled based on this detection. Therefore, the high rise of installation cost can be suppressed.

Moreover, based on the detection of the approaching of the person by the person detecting sensor 11 provided in the showcase 1A disposed in such a position that the approaching of the person can first be detected, all the LED illumination apparatuses 15 perform illumination with the bright illumination intensity. Therefore, it is possible to suppress the high rise of running cost due to the lighting of the LED illumination apparatuses more than necessary.

Furthermore, in the present embodiment, the showcases 1A to 1D and 1E to 1H provided so as to face each other as described above form pairs, respectively, and both the LED illumination apparatuses are controlled by the output from the main control apparatus 33 to the case control apparatuses C owing to the detection of the approaching of the person in the showcase 1A provided with the person detecting sensor 11. In consequence, the illumination intensities of the LED illumination apparatuses 15 of the showcases 1A to 1H can be controlled based on the person detecting sensor 11 provided in one of the facing showcases, that is, the showcase 1A here, without providing the person detecting sensors 11 for each row of the arranged showcases.

Therefore, as compared with a case where the person detecting sensors 11 are installed in all the showcases, the high rise of the installation cost can be suppressed. Moreover, similar illumination control is performed with respect to the pair of showcases facing each other, and hence the presentation effect can be improved.

It is to be noted that in such an embodiment, the person detecting sensor 11 is provided only in the showcase 1A on the entrance side of the passage P, but this is not restrictive. The person detecting sensor 11 may be provided on the side of the passage P opposite to the showcase 1A, that is, the showcase 1D (or the showcase 1H forming the pair with the showcase 1A), and the illumination control of each showcase by the LED illumination apparatus 15 may be performed based on the detection of the approaching of the person by the person detecting sensor 11 substantially in the same manner as in the above embodiment.

Embodiment 2

Figure 6:
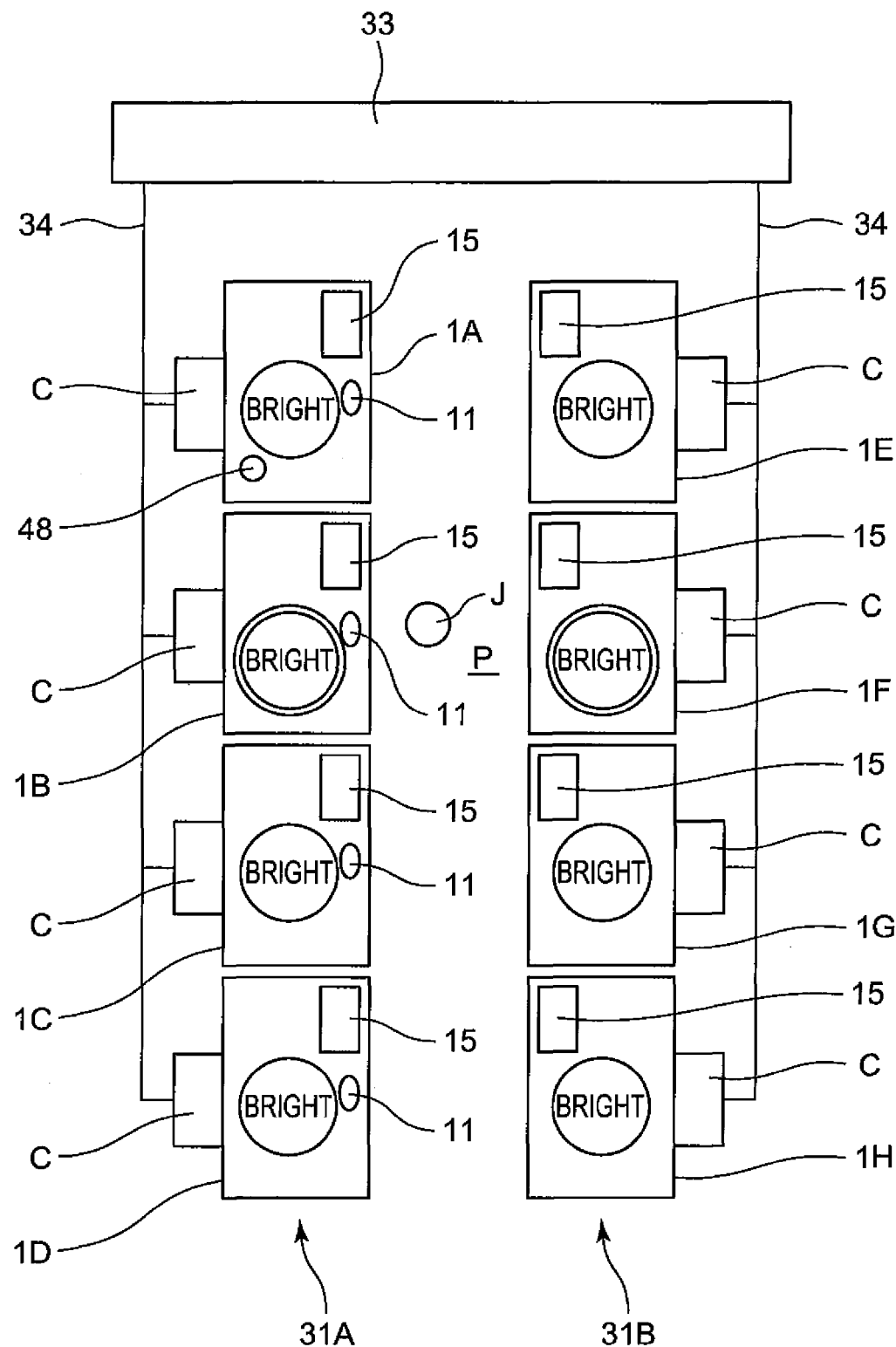
FIG. 6 is a control system constitution diagram (Embodiment 2)

Next, the illumination control of a showcase as Embodiment 2 will be described with reference to FIG. 6. Each showcase 1 and control apparatuses 33 and C in Embodiment 2 have a constitution substantially similar to that of the above embodiment, and hence the description thereof is omitted. In Embodiment 2, person detecting sensors 11 for detecting the approaching of any person are provided in showcases 1A to 1D of a row 31A constituting a passage P.

The illumination control of each showcase 1 in Embodiment 2 having such a constitution will be described. First, the case control apparatus C of the showcase 1A provided with an illumination intensity sensor 48 detects an illumination intensity in a store (a surrounding area) by the illumination intensity sensor 48, and transmits the illumination intensity to the main control apparatus 33. Based on the illumination intensity, the main control apparatus 33 determines a second illumination intensity as the maximum illumination intensity of each LED illumination apparatus 15 provided in a display chamber 5 of each showcase 1. In the present embodiment, the second illumination intensity is determined so that the inside of the display chamber 5 is brightened as much as a predetermined illumination intensity as compared with the surrounding illumination intensity detected by the illumination intensity sensor 48. Based on this illumination intensity, the main control apparatus 33 also determines a first illumination intensity darker as much as the predetermined illumination intensity than the second illumination intensity.

Moreover, based on a detection output from the person detecting sensor 11 indicating that a person J has approached one of the person detecting sensors 11 provided in the showcases 1A to 1D, that is, the person J has entered a predetermined range of a distance from one of the showcases 1A to 1D, the case control apparatus C provided with the person detecting sensor 11 transmits, to the main control apparatus 33, an output indicating that the person J has approached the passage P.

In consequence, the main control apparatus 33 transmits, to the case control apparatuses C of all the showcases 1A to 1H, an output indicating that the illumination intensity of the LED illumination apparatus 15 be set to the first illumination intensity for performing the illumination. Based on this output, the case control apparatus C of each showcase energizes LED elements 17 of the LED illumination apparatus 15. Therefore, in principle, the LED elements 17 of each LED illumination apparatus 15 are not energized and are turned off in a state in which the person detecting sensor 11 does not detect the approaching of the person J.

In addition, the main control apparatus 33 transmits an output indicating that the illumination intensity of the LED elements 17 of the LED illumination apparatus 15 be set to the second illumination intensity (the maximum illumination intensity) brighter than the first illumination intensity to perform the illumination to the case control apparatus C of the showcase 1 provided with the person detecting sensor 11 which has detected the approaching of the person J and the case control apparatus C of the showcase constituting a pair with the showcase.

Therefore, in a case where the person detecting sensor 11 transmits the output indicating that the approaching of the person J has been detected to one of the case control apparatuses C, the main control apparatus 33 illuminates all the showcases 1A to 1H with the first illumination intensity by the LED illumination apparatuses, and illuminates the showcase provided with the person detecting sensor 11 which has detected the approaching of the person J and the showcase facing the showcase to constitute a pair with the second illumination intensity brighter than the illumination intensity of the other showcases.

In consequence, the showcase actually approached by the person J and the showcase constituting the pair with the showcase are illuminated more brightly than the other showcases, whereby a presentation effect can be improved, and customers' interest can be attracted to commodities displayed in the showcase.

Moreover, in a case where the person J who has entered the passage P moves, the person detecting sensor 11 detecting the approaching of the person J changes. For example, when the person J enters the passage P, the person detecting sensor 11 provided in the showcase 1A first detects the approaching of the person. However, when the person J moves in the depth direction of the passage P, the person detecting sensor 11 provided in the showcase 1A does not detect the approaching of the person J, and the person detecting sensor 11 provided in the adjacent showcase 1B detects the approaching of the person J.

In this case, when the person detecting sensor 11 actually detecting the approaching of the person J changes from the sensor provided in the showcase 1A to the sensor provided in the showcase 1B, the main control apparatus 33 changes (moves) the showcase to be illuminated more brightly than the other showcases from the showcase 1A to the showcase 1B.

Therefore, the showcase most approached by the person J can always be illuminated more brightly than the other showcases, the presentation effect can be improved, and the customers' interest can be attracted.

Moreover, each case control apparatus C illuminates the inside of the display chamber 5 by each LED element 17 with the first illumination intensity determined based on the surrounding illumination intensity from a state in which each element is turned off, or the second illumination intensity (the maximum illumination intensity) brighter than the first illumination intensity. In consequence, the brightness of each showcase 1 illuminated by the LED elements 17 of the LED illumination apparatus 15 can be determined in accordance with the brightness of a surrounding area such as a store in which the showcase 1 is installed, and incompatibility with the surrounding illumination can be avoided.

In consequence, the inside of the display chamber 5 can effectively be illuminated by the LED illumination apparatus 15 with the appropriate illumination intensity, and an illumination effect can be improved.

It is to be noted that in such an embodiment, the illumination intensities of the LED illumination apparatuses 15 of all the showcases other than the showcase provided with the person detecting sensor 11 detecting the approaching of the person is set to the first illumination intensity darker than the second illumination intensity, and the illumination intensity of the LED illumination apparatus 15 of the showcase approached by the person is set to the illumination intensity different from that of the LED illumination apparatus 15 of the other showcase. In addition, the illumination control may be performed so that the illumination intensity of the showcase other than the showcase provided with the person detecting sensor 11 detecting the approaching of the person decreases to that of the showcase installed in a position far from the showcase provided with the person detecting sensor 11 detecting the approaching of the person. In consequence, the showcase most approached by the person is illuminated brightest by the LED illumination apparatus 15, and the illumination intensities of the arranged showcases are gradually decreased to the illumination intensity of the far showcase. In consequence, the whole brightness can be gradated, and the presentation effect can further be improved.

Moreover, in a case where any of the person detecting sensors 11 provided in the showcases 1A to 1D does not detect the approaching of the person J, after the elapse of a predetermined time from the non-detection time, the main control apparatus 33 transmits, to each case control apparatus C, an output indicating that the illumination intensity of each LED illumination apparatus 15 be decreased or that each LED illumination apparatus be turned off. In consequence, each case control apparatus C decreases the energization of the LED elements 17 of the LED illumination apparatus 15, or stops the energization to turn off the LED elements based on the output from the main control apparatus 33. It is to be noted that in a case where the illumination intensities of the LED illumination apparatuses 15 of the showcases are different from each other, that is, the illumination intensity is controlled so that the showcase provided in the position far from the showcase provided with the person detecting sensor 11 detecting the approaching of the person is darker than the showcase provided with the person detecting sensor, after the elapse of the predetermined time from a time when any person is not detected, the showcases may simultaneously be turned off or darkened, but this is not restrictive. Each illumination intensity may gradually be decreased to finally turn off the LED illumination apparatus or decrease the illumination intensity to a predetermined dark illumination intensity. At this time, the LED illumination apparatuses may simultaneously be turned off, or darkened to the predetermined dark illumination intensity. However, each illumination intensity may gradually be decreased to turn off the light of each showcase after delay or darken the showcase to the predetermined dark illumination intensity.

In consequence, all the LED illumination apparatuses 15 illuminate the plurality of arranged showcases with the predetermined illumination intensity based on the detection of the approaching of the person J by the person detecting sensors 11 provided in the showcases, so that it is possible to suppress the high rise of running cost due to the lighting of the LED illumination apparatuses more than necessary.

Moreover, even in such an embodiment, the showcases 1A to 1D and 1E to 1H provided so as to face each other as described above form pairs, respectively, and both the LED illumination apparatuses 15 are controlled by the output from the main control apparatus 33 to the case control apparatuses C owing to the detection of the approaching of the person J in the showcase 1A provided with the person detecting sensor 11. In consequence, the illumination intensities of the LED illumination apparatuses 15 of the showcases 1A to 1H can be controlled based on the person detecting sensor 11 provided in one of the facing showcases, that is, the showcases 1A to 1D here, without providing the person detecting sensors 11 for each row of the arranged showcases.

Therefore, as compared with a case where the person detecting sensors 11 are installed in all the showcases, the high rise of the installation cost can be suppressed. Moreover, similar illumination control is performed with respect to the pair of showcases facing each other, and hence the presentation effect can be improved.

It is to be noted that in the present embodiment, the person detecting sensors 11 are provided in the showcases 1A to 1D constituting the row 31A, but this is not restrictive, and the person detecting sensor may be provided in one of the showcases facing each other to form a pair.

Embodiment 3

Figure 7:
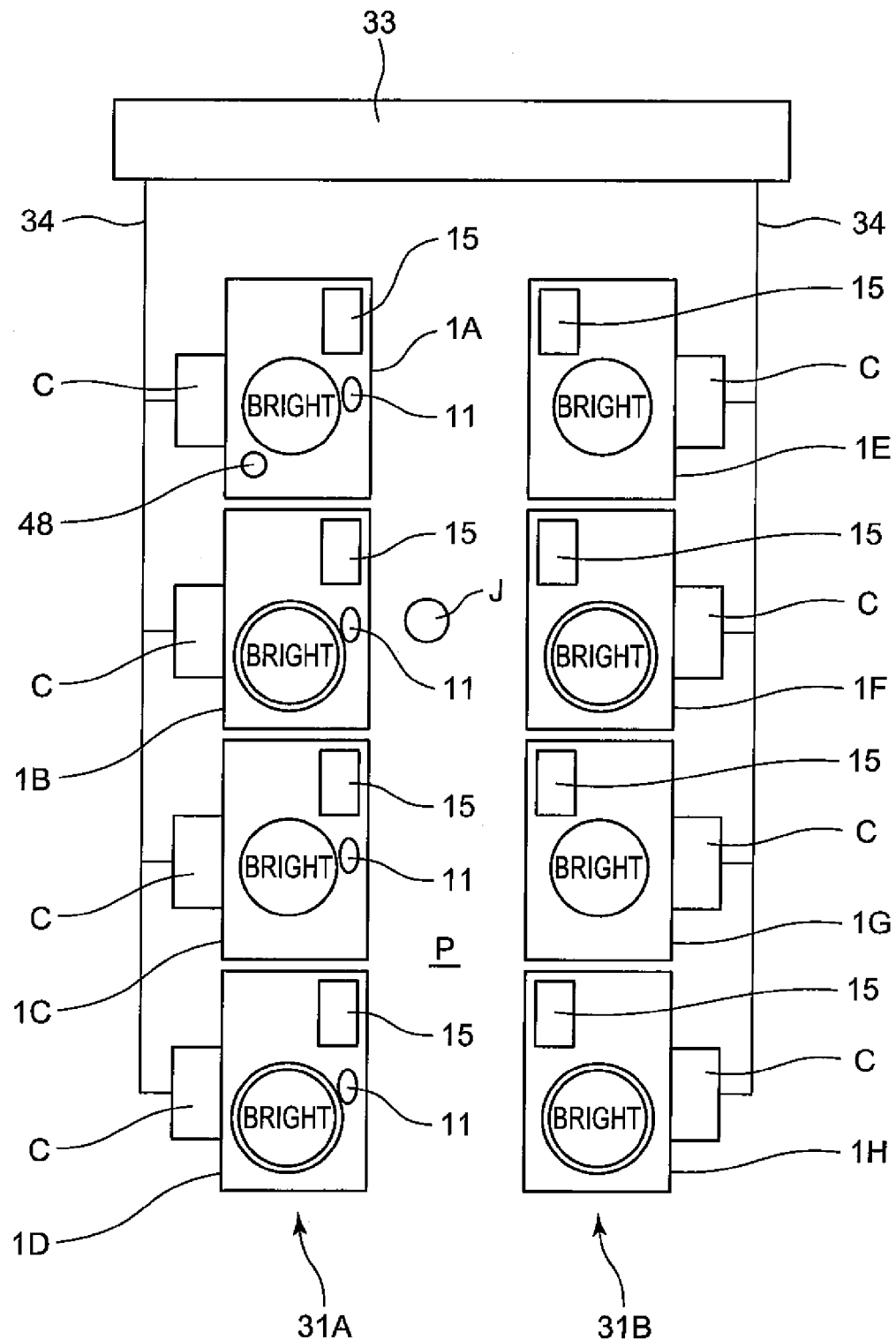
FIG. 7 is a control system constitution diagram (Embodiment 3).

Next, the illumination control of a showcase as Embodiment 3 will be described with reference to FIG. 7. Each showcase 1 and control apparatuses 33 and C in Embodiment 3 have a constitution substantially similar to that of the above embodiment, and hence the description thereof is omitted. In the same manner as in Embodiment 2, person detecting sensors 11 for detecting the approaching of any person J are provided in showcases 1A to 1D of a row 31A constituting a passage P.

The illumination control of each showcase 1 in Embodiment 3 having such a constitution will be described. First, the case control apparatus C of the showcase 1A provided with an illumination intensity sensor 48 detects an illumination intensity in a store (a surrounding area) by the illumination intensity sensor 48, and transmits the illumination intensity to the main control apparatus 33. Based on the illumination intensity, the main control apparatus 33 determines a second illumination intensity as the maximum illumination intensity of each LED illumination apparatus 15 provided in a display chamber 5 of each showcase 1. In the present embodiment, the second illumination intensity is determined so that the inside of the display chamber 5 is brightened as much as a predetermined illumination intensity as compared with the surrounding illumination intensity detected by the illumination intensity sensor 48. Based on this illumination intensity, the main control apparatus 33 also determines a first illumination intensity darker as much as the predetermined illumination intensity than the second illumination intensity.

Moreover, based on a detection output from the person detecting sensor 11 indicating that the person J has approached one of the person detecting sensors 11 provided in the showcases 1A to 1D, that is, the person J has entered a predetermined range of a distance from one of the showcases 1A to 1D, the case control apparatus C provided with the person detecting sensor 11 transmits, to the main control apparatus 33, an output indicating that the person J has approached the passage P.

In consequence, the main control apparatus 33 transmits an output indicating that the illumination intensity of the LED illumination apparatus 15 be set to the first illumination intensity for the illumination to the case control apparatuses C of the showcase disposed adjacent to the showcase provided with the person detecting sensor 11 which has detected the approaching of the person J and the showcase facing the showcase to constitute a pair. Based on this output, the case control apparatuses C of the showcase disposed adjacent to the showcase provided with the person detecting sensor 11 which has detected the approaching of the person J and the showcase constitute the pair with the showcase energize LED elements 17 of the LED illumination apparatuses 15. Therefore, in principle, the LED elements 17 of each LED illumination apparatus 15 are not energized and are turned off in a state in which the person detecting sensor 11 does not detect the approaching of the person J.

Moreover, the main control apparatus 33 transmits an output indicating that the illumination intensity of the LED elements 17 of the LED illumination apparatus 15 be set to the second illumination intensity (the maximum illumination) brighter than the first illumination intensity to perform the illumination to the case control apparatus C of the showcase 1 provided with the person detecting sensor 11 which has detected the approaching of the person J and the case control apparatus C of the showcase constituting a pair with the showcase.

Therefore, in a case where the case control apparatus C connected to the person detecting sensor 11 detecting the approaching of the person J is present, the main control apparatus 33 illuminates the showcase with the first illumination intensity by the LED illumination apparatus 15 provided in the showcase adjacent to the showcase. Moreover, the showcase provided with the person detecting sensor 11 detecting the approaching of the person J, the showcase other than the adjacent showcase, and the showcases facing these showcases to constitute pairs are illuminated with the second illumination intensity brighter than the adjacent showcase.

In consequence, the showcase actually approached by the person J can be illuminated more brightly than the adjacent showcase, whereby a presentation effect can be improved, and customers' interest can be attracted to commodities displayed in the showcase.

Moreover, in a case where the person J who has entered the passage P moves, the person detecting sensor 11 detecting the approaching of the person J changes. For example, when the person J enters the passage P, the person detecting sensor 11 provided in the showcase 1A first detects the approaching of the person. However, when the person J moves in the depth direction of the passage P, the person detecting sensor 11 provided in the showcase 1A does not detect the approaching of the person J, and the person detecting sensor 11 provided in the adjacent showcase 1B detects the approaching of the person J.

In this case, when the person detecting sensor 11 actually detecting the approaching of the person J changes from the sensor provided in the showcase 1A to the sensor provided in the showcase 1B, the main control apparatus 33 changes (moves) the showcase to be illuminated more brightly than the adjacent showcases on both sides from the showcase 1A to the showcase 1B.

Therefore, the showcase most approached by the person J can always be illuminated more brightly than the adjacent showcases on both the sides, the presentation effect can be improved, and the customers' interest can be attracted.

Moreover, each case control apparatus C illuminates the inside of the display chamber 5 by each LED element 17 with the first illumination intensity determined based on the surrounding illumination intensity from a state in which each element is turned off, or the second illumination intensity (the maximum illumination intensity) brighter than the first illumination intensity. In consequence, the brightness of each showcase 1 illuminated by the LED elements 17 of the LED illumination apparatus 15 can be determined in accordance with the brightness of a surrounding area such as a store in which the showcase 1 is installed, and incompatibility with the surrounding illumination can be avoided.

In consequence, the inside of the display chamber 5 can effectively be illuminated by the LED illumination apparatus 15 with the appropriate illumination intensity, and an illumination effect can be improved.

Moreover, in a case where any of the person detecting sensors 11 provided in the showcases 1A to 1D does not detect the approaching of the person J, after the elapse of a predetermined time from the non-detection time, the main control apparatus 33 transmits, to each case control apparatus C, an output indicating that the illumination intensity of each LED illumination apparatus 15 be decreased or that each LED illumination apparatus be turned off. In consequence, each case control apparatus C decreases the energization of the LED elements 17 of the LED illumination apparatus 15, or stops the energization to turn off the LED elements based on the output from the main control apparatus 33.

In consequence, all the LED illumination apparatuses 15 illuminate the plurality of arranged showcases with the predetermined illumination intensity based on the detection of the approaching of the person J by the person detecting sensors 11 provided in the showcases, so that it is possible to suppress the high rise of running cost due to the lighting of the LED illumination apparatuses 15 more than necessary.

Moreover, even in such an embodiment, the showcases 1A to 1D and 1E to 1H provided so as to face each other as described above form pairs, respectively, and both the LED illumination apparatuses 15 are controlled by the output from the main control apparatus 33 to the case control apparatuses C owing to the detection of the approaching of the person in the showcase 1A provided with the person detecting sensor 11. In consequence, the illumination intensities of the LED illumination apparatuses 15 of the showcases 1A to 1H can be controlled based on the person detecting sensor 11 provided in one of the facing showcases, that is, the showcases 1A to 1D here, without providing the person detecting sensors 11 for each row of the arranged showcases.

Therefore, as compared with a case where the person detecting sensors 11 are installed in all the showcases, the high rise of the installation cost can be suppressed. Moreover, similar illumination control is performed with respect to the pair of showcases facing each other, and hence the presentation effect can be improved.

It is to be noted that in the present embodiment, the person detecting sensors 11 are provided in the showcases 1A to 1D constituting the row 31A, but this is not restrictive, and the person detecting sensor may be provided in one of the showcases facing each other to form a pair.

In the above embodiments, the case control apparatus C of each showcase beforehand holds, as a high temperature value, an in-chamber temperature supposed as a temperature having a high possibility that the remarkable deterioration, failure or the like of the LED illumination apparatus 15 itself might be caused, in order to protect the LED elements 17 of the LED illumination apparatus 15 which are energized to generate heat. It is to be noted that the high temperature value can arbitrarily be set.

Moreover, when the temperature reaches the high temperature value, the case control apparatus C controls a current/a voltage for energizing the LED elements 17 of the LED illumination apparatus 15 provided in the showcase to decrease the illumination intensity based on the temperature detected by the in-chamber temperature sensor 50 installed in the display chamber 5.

In the present embodiment, the illumination intensity is set to about 50% of the maximum illumination intensity. It is to be noted that the illumination intensity is not limited to this example, and based on the detection of the high temperature value, the LED illumination apparatus 15 may be turned off or the illumination intensity of the LED illumination apparatus 15 may gradually be decreased.

In consequence, it is possible to decrease the heat generated by the energized LED elements 17 themselves of the LED illumination apparatus 15. Therefore, it is possible to avoid disadvantages that the LED illumination apparatus 15 is lit with the bright illumination intensity in a state in which the inside of the display chamber is not cooled to a predetermined cooling temperature in a trial operation mode, a non-cooling mode or the like and that the LED elements 17 of the LED illumination apparatus 15 are extraordinarily heated to cause the deterioration and failure of the apparatus itself.

Moreover, when the case control apparatus C controls the LED illumination apparatus 15 based on the detection of the high temperature value so as to decrease the illumination intensity (or turn off the light), the case control apparatus displays a present mode such as the trial operation mode or the non-cooling mode in the temperature display section 51 provided in the main body 2 of the showcase 1.

In consequence, a user can be notified that the control is performed so as to decrease the illumination intensity of the LED illumination apparatus 15 at present, and the user can recognize that any failure or the like is not generated.

Even when the illumination intensity of the LED illumination apparatus 15 is controlled as described above, the LED element 17 constituting the LED illumination apparatus 15 has a high durability against turning ON/OFF as compared with a fluorescent lamp heretofore used as the illumination apparatus, and can secure a predetermined illumination intensity under ON/OFF control even under an environment at a low temperature, so that appropriate illumination control can be realized.

Moreover, the LED element 17 has a remarkably long life as compared with the fluorescent lamp, and hence can obviate the need for an illumination replacing operation. In consequence, the need for a laborious operation such as the constant storage of a replacing component or the disposal of wastes discharged due to the replacement can be obviated.

What is claimed is:

1. A control apparatus which controls a plurality of arranged showcases so that display chambers where commodities are displayed are illuminated with LED illumination apparatuses, comprising:
   a person detecting sensor provided in one of the plurality of arranged showcases, disposed in such a position that the approaching of any person is first detected among the plurality of arranged showcases, so that the approaching of the person is detected,
   a microcomputer having a set of instructions for controlling the plurality of arranged showcases,
   wherein the microcomputer controls the plurality of arranged showcases in a manner that when the person detecting sensor detects the approaching of the person, the illumination intensities of all the LED illumination apparatuses of the plurality of arranged showcases are increased.

2. The control apparatus of the showcase according to claim 1, wherein the illumination intensities of the LED illumination apparatuses are increased successively from the showcase provided with the person detecting sensor to the showcase disposed in a position far from the showcase provided with the person detecting sensor.

3. A control apparatus which controls a plurality of arranged showcases so that display chambers where commodities are displayed are illuminated with LED illumination apparatuses, comprising:
   person detecting sensor provided in each of the plurality of arranged showcases, respectively, so that the approaching on any person is detected by one of the sensors,
   a microcomputer having a set of instructions for controlling the plurality of arranged showcases,
   wherein the microcomputer controls the plurality of arranged showcases in a manner that when one of the person detecting sensors detects the approaching of the person, the illumination intensity of the LED illumination apparatus of the showcase adjacent to the showcase provided with the person detecting sensor which has detected the approaching of the person is increased to a first illumination intensity, and the illumination intensity of the LED illumination apparatus of the showcase provided with the person detecting sensor which has detected the approaching of the person is increased to a second illumination intensity brighter than the first illumination intensity.

4. The control apparatus of the showcase according to any one of claims 1 to 3, wherein
each showcase displays the commodities in the display chamber while cooling the commodities, and includes a temperature sensor which detects a temperature in the display chamber, and
in a case where the temperature sensor detects that the temperature in the display chamber increases to a preset high temperature value, the illumination intensity of the LED illumination apparatus of the showcase provided with the temperature sensor is decreased.

5. A control apparatus which controls a plurality of arranged showcases so that display chambers where commodities are displayed are illuminated with LED illumination apparatuses, comprising:
a person detecting sensor provided in each of the plurality of arranged showcases, respectively, so that the approaching of any person is detected by one of the sensors,
a microcomputer having a set of instructions for controlling the plurality of arranged showcases,
wherein the microcomputer controls the plurality of arranged showcases in a manner that when one of the person detecting sensors detects the approaching of the person, the illumination intensities of all the LED illumination apparatuses of the plurality of arranged showcases are increased to a first illumination intensity, and the illumination intensity of the LED illumination apparatus of the showcase provided with the person detecting sensor which has detected the approaching of the person is increased to a second illumination intensity brighter than the first illumination intensity.

6. The control apparatus of the showcase according to claim 5, wherein the first illumination intensity is dark in the showcase installed in a position far from the showcase provided with the person detecting sensor which has detected the approaching of the person.

7. The control apparatus of the showcase according to any one of claims 1 to 3, further comprising:
an illumination intensity sensor which detects the brightness of a surrounding area, wherein the maximum illumination intensity of the LED illumination apparatus is determined in accordance with the brightness of the surrounding area detected by the illumination intensity sensor, and the LED illumination apparatus is brightened to the determined maximum illumination intensity or the second illumination intensity regarded as the maximum illumination intensity.

8. A control apparatus of a showcase which controls a plurality of showcases so that display chambers where commodities are displayed are illuminated with LED illumination apparatuses, comprising:
a person detecting sensor provided in a showcase disposed in such a position that the approaching of any person is first detected among the plurality of arranged showcases, so that the approaching of the person is detected, wherein
when the person detecting sensor detects the approaching of the person, the illumination intensities of all the LED illumination apparatuses of the plurality of showcases are increased,
the plurality of showcases are provided in at least two rows so as to face each other,
the person detecting sensor is provided in one of the showcases facing each other, and
the control of the LED illumination apparatus by the detection of the person detecting sensor is executed with respect to both the LED illumination apparatuses of the pair of showcases facing each other.

9. A control apparatus of a showcase which controls a plurality of showcases so that display chambers where commodities are displayed are illuminated with LED illumination apparatuses, comprising:
a person detecting sensor provided in a showcase disposed in such a position that the approaching of any person is first detected among the plurality of arranged showcases, so that the approaching of the person is detected, wherein
when the person detecting sensor detects the approaching of the person, the illumination intensities of all the LED illumination apparatuses of the plurality of showcases are increased,
the illumination intensities of the LED illumination apparatuses are increased successively from the showcase provided with the person detecting sensor to the showcase disposed in a position far from the showcase provided with the person detecting sensor,
the plurality of showcases are provided in at least two rows so as to face each other,
the person detecting sensor is provided in one of the showcases facing each other, and
the control of the LED illumination apparatus by the detection of the person detecting sensor is executed with respect to both the LED illumination apparatuses of the pair of showcases facing each other.

10. A control apparatus of a showcase which controls a plurality of showcases so that display chambers where commodities are displayed are illuminated with LED illumination apparatuses, comprising:
person detecting sensors provided in the plurality of arranged showcases, respectively, so that the approaching of any person is detected, wherein when one of the person detecting sensors detects the approaching of the person, the illumination intensities of all the LED illumination apparatuses of the plurality of showcases are increased to a first illumination intensity,
the illumination intensity of the LED illumination apparatus of the showcase provided with the person detecting sensor which has detected the approaching of the person is increased to a second illumination intensity brighter than the first illumination intensity,
the plurality of showcases are provided in at least two rows so as to face each other,
the person detecting sensor is provided in one of the showcases facing each other, and
the control of the LED illumination apparatus by the detection of the person detecting sensor is executed with respect to both the LED illumination apparatuses of the pair of showcases facing each other.

11. The control apparatus of the showcase according to claim 10, wherein
the first illumination intensity is dark in the showcase installed in a position far from the showcase provided with the person detecting sensor which has detected the approaching of the person.

12. A control apparatus of a showcase which controls a plurality of showcases so that display chambers where commodities are displayed are illuminated with LED illumination apparatuses, comprising:
person detecting sensors provided in the plurality of arranged showcases, respectively, so that the approaching on any person is detected, wherein
when one of the person detecting sensors detects the approaching of the person, the illumination intensity of the LED illumination apparatus of the showcase adjacent to the illumination intensity of the LED illumination apparatus of the showcase provided with the person detecting sensor which has detected the approaching of the person is increased to a second illumination intensity brighter than the first illumination intensity, the plurality of showcases are provided in at least two rows so as to face each other, the person detecting sensor is provided in one of the showcases facing each other, and the control of the LED illumination apparatus by the detection of the person detecting sensor is executed with respect to both the LED illumination apparatuses of the pair of showcases facing each other.

* * * * *